March 29, 1955
R. A. WISE
2,705,276
HEATING DEVICE CONTROL CIRCUIT
Filed July 30, 1954
2 Sheets-Sheet 1
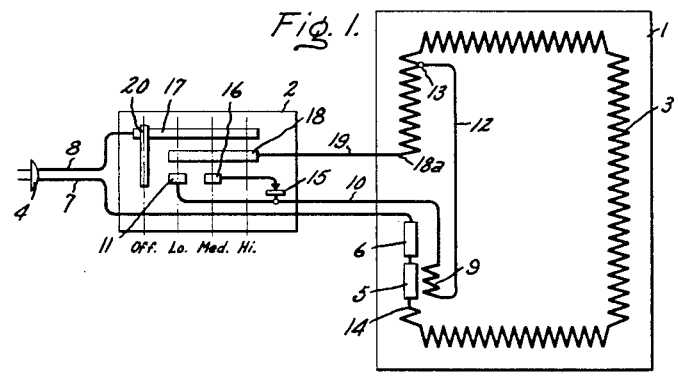
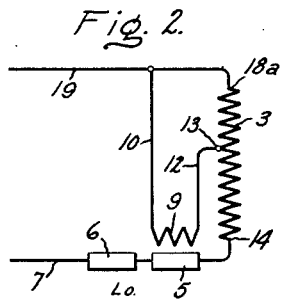
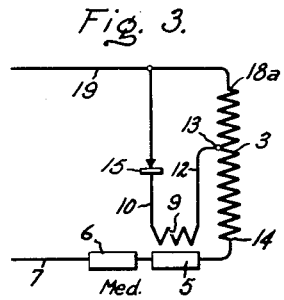
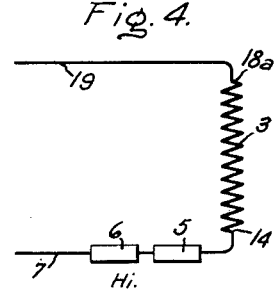
Inventor:
Robert A. Wise,
by Frank L. Neuhauser
His Attorney.

March 29, 1955     R. A. WISE     2,705,276
HEATING DEVICE CONTROL CIRCUIT
Filed July 30, 1954     2 Sheets-Sheet 2
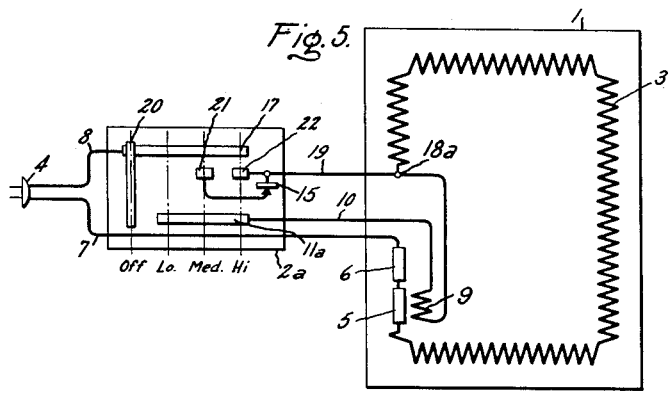
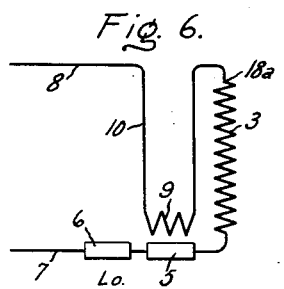
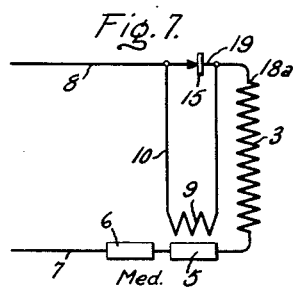
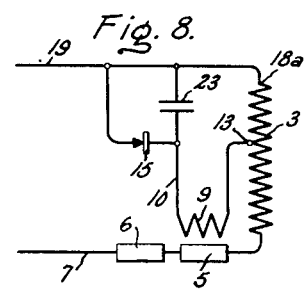
*Inventor:*
*Robert A. Wise,*
by *Frank P. Neubauer*
*His Attorney.*

United States Patent Office 2,705,276
Patented Mar. 29, 1955

2,705,276

HEATING DEVICE CONTROL CIRCUIT

Robert A. Wise, Asheboro, N. C., assignor to General Electric Company, a corporation of New York Application July 30, 1954, Serial No. 446,756

16 Claims. (Cl. 219—20)

My invention relates to improvements in electric circuits and controls therefor and more particularly to improvements in circuits and controls for heating devices, such as heating pads and the like.

In various electric heating devices, it is desirable to obtain selectively several temperature settings. By way of example, in heating pads it is customary to provide a plurality of different settings by which the pad can be operated at any of the several selected temperatures. This is sometimes accomplished by providing an auxiliary heater adjacent the controlling thermostat and varying the current to the heater so as to vary the amount of heat supplied thereby to the thermostat. In this way the temperature of the heating pad at what the control thermostat reaches its cut-off point may be varied.

In several prior art structures, particularly in the heating pad field, a resistor has been included in the circuit of the auxiliary heater for varying the current supplied to the auxiliary heater. The selector switch for varying the temperature is usually somewhat remote from the heating pad itself. In order to minimize the number of wires from the selector switch to the heating pad, it would be an advantage to place the aforementioned resistor in the casing of the selector switch. However, substantial amount of heat must then be dissipated in the selector switch, and this is undesirable. By my invention a simplified control is provided for securing a substantial spread of temperature between the several settings without the necessity for the aforementioned heat dissipation in the selector switch.

It is an object of my invention to provide an electric circuit and control therefor for securing a plurality of different temperature settings of a heating device.

It is another object of my invention to provide a circuit including a remote control switch for selecting any one of several temperature settings for the heating device and in which a negligible amount of heat or power is dissipated in the switch.

It is a further object of my invention to provide an electric circuit and control therefor whereby several widely spaced temperature settings of a heating device are secured.

Other objects and advantages of my invention will become apparent as the following description proceeds and the features of novelty which characterize my invention will be pointed out with particularity in the claims annexed to and forming part of this specification.

For a better understanding of my invention, reference may be made to the accompanying drawing in which Figure 1 is a schematic wiring diagram of an embodiment of my invention applied to a heating pad.

Figure 2 is a simplified diagram showing the active portions of the circuit in the low temperature setting.

Figure 3 is a simplified diagram showing the active portions of the circuit in the medium temperature setting.

Figure 4 is a similar diagram showing the active portions of the circuit in the high temperature setting.

Figure 5 is a schematic wiring diagram showing a modfied form of my invention.

Figure 6 is a simplified diagram showing active portions of the circuit of Figure 5 in the low temperature setting.

Figure 7 is a simplified diagram showing active portions of the circuit of Figure 5 in the medium temperature setting.

Fig. 8 is a simplified diagram showing the active portions of the circuit of another modified form of my invention in the medium temperature setting.

In carrying out the objects of my invention an auxiliary heater is provided adjacent the control thermostat of a heating device. A selector switch is provided in conjunction with this circuit whereby in one position a power supply may be connected directly to the heating device without introducing the auxiliary heater into the circuit. In another position of the switch, power is also supplied to the auxiliary heater. In still another position of the switch a half-wave rectifier is connected either in series or in parallel with the auxiliary heater to reduce the current supplied thereto in order to obtain a different temperature setting.

Although it will be obvious as the description proceeds that my invention is applicable to a wide range of heating devices, for convenience it will be described in connection with one specific application, namely in controlling the temperature of a heating pad. Referring to the drawing, the heating pad is indicated diagrammatically by the rectangle 1 and the control or selector switch is indicated diagrammatically by the rectangle 2. The heating pad includes a heating element 3. This heating element has been indicated diagrammatically extending about the margin of the heating pad but it will be obvious that in this application it can be arranged in any desirable manner over the entire surface of the heating pad. Power is supplied to the heating element 3 from any suitable source to which it may be connected by the plug 4. The circuit of the heating pad includes a control thermostat 5 and the usual safety thermostat 6. The plug 4 is connected to one end of the heating element 3 through the thermostats 5 and 6 by means of line 7. A second line 8 from the plug 4 extends to the selector switch 2, and this line may be connected by means of the selector switch selectively with different elements of the circuit, as described below, to obtain a plurality of temperature settings of the heating pad.

In order to vary the temperature of the heating pad by altering the response to the control thermostat 5, an auxiliary heater 9 is provided which may be selectively connected into the circuit to supply heat to the control thermostat 5. One end of the auxiliary heater is connected by line 10 to a terminal 11 within the selector switch casing. The other end of the auxiliary heater 9 is connected by a line 12 to the main heating element 3. In the form illustrated, the line 12 is connected to an intermediate point along the length of the heating element 3, as indicated at 13. However, depending upon the particular temperature settings desired, the auxiliary heater can be connected at a different point along the length of the heating element 3, or the intermediate tap may be eliminated entirely and the line 12 connected to one end of the heating element, for example, at 14. Preferably the heater is connected in series with a portion of the heating element because the voltage across the rectifier to be discussed later is thereby reduced and a smaller, for example one-call, rectifier can be employed.

It will be appreciated that the control thermostat 5 will reach its cut-off temperature more quickly when current is supplied to the auxiliary heater 9 than when this heater is deenergized, and accordingly the heating pad will be cut off at a lower temperature when the auxiliary heater is energized.

In accordance with my invention still a third, or intermediate temperature, of the heating pad is achieved by associating with the auxiliary heater a half-wave rectifier by means of which the energy supplied to the auxiliary heater is reduced to about fifty percent of its previous value. As shown in the diagram, the half-wave rectifier 15, which may be of a dry or plate type, is connected between the line 10 and a terminal 16 of the selector switch 2.

Portions of the selector switch have been described in connection with the foregoing description of the heating and control circuit. In addition, the selector switch includes an elongated conducting bar or strip 17 which is connected at one end to the line 8. The selector switch includes a second elongated conducting bar or strip 18 which is connected to one end 18a of the heating element 3 by line 19. Finally, this switch includes a manual control element, shown diagrammatically merely as a slider 20, which comprises an elongated conducting bar or strip, arranged transversely to the elongated strips 17 and 18. The slider 20 is adapted also to engage the contacts 11 and 16 in appropriate positions of the selector switch. It will be apparent, of course, that the slider 20 would include a suitable electrical insulating handle or knob for engagement by the user. Further a rotatable switch could be equally well employed in lieu of the slider illustrated. However, such details of mechanical structure form no part of my invention and hence they have not been illustrated in this drawing.

By means of the selector switch and circuit arrangement described above it will be apparent that three different temperature settings of the heating pad can be obtained. For simplicity, the active portions of the circuit in the low, medium and high temperature settings of the selector switch have been illustrated in Figs. 2, 3 and 4. The operation of the circuit can be appreciated from a consideration of Figs. 1, 2, 3 and 4. Thus, the slider or manually actuated switch element 20 is shown in Figure 1 in the "off" position, wherein no current is supplied to the heating element 3. When the slider is moved to the right to the line indicated by the legend "Lo," a low temperature setting of the heating pad is obtained. The active portion of the circuit under this temperature setting is illustrated in Figure 2. With this setting of the switch, a circuit is completed from the power source through the plug 4 to the heating element 3 through the conducting strip 18. A second circuit is provided through the line 8, the conducting strip 17, and the contact 11 to the auxiliary heater 9. Power supplied to the auxiliary heater 9, as explained above, causes the temperature of the associated control thermostat 5 to reach the cut-off point sooner than would be the case in the absence of this heater, and hence the thermostat 5 acts to de-energize the heating element 3 at a relatively low temperature.

If it is desired to obtain a somewhat higher, or medium, temperature, the switch is moved to shift the slider 20 to the right to the position indicated by the legend "Med." in Fig. 1. The active parts of the circuit in this selector switch setting are shown in Fig. 3. As in the low temperature circuit, the slider 20 in the medium temperature setting also completes a circuit to the element 3 from the line 8 through the conducting strip 18. In this position the slider 20 also completes a circuit from the line 8 through the contact 16 to the half-wave rectifier 15 which is connected, in this temperature setting, in series with the auxiliary heater 9. The half-wave rectifier, it will be readily understood, reduces the power supplied to the auxiliary heater 9 to about one-half the value in the low temperature setting. Accordingly, a smaller amount of heat is supplied from the auxiliary heater 9 to the control thermostat 5 and a higher temperature of the heating pad is reached before the cut-off temperature of the control thermostat is reached.

For achieving the highest temperature setting of the heating pad the selector switch is moved still further to the right to the line indicated by the legend "Hi." The active portion of the circuit in this position is shown in Fig. 4. It can be seen that the slider 20 in the high position, that is at the high temperature setting of the heating pad, connects only the conducting strips 17 and 18, thereby completing a circuit through only the heating element 3. Both the auxiliary heater 9 and the half-wave rectifier 15 are eliminated from the active circuit in this temperature setting. Accordingly, no heat is supplied from the auxiliary heater 9 to the control thermostat 5, and a still higher temperature of the heating pad must be reached before sufficient heat is received by the control thermostat 5 to bring it to its cut-off temperature.

It can be seen that, by the arrangement described above, a control is provided for a heating device by which a plurality of temperature settings may be selectively secured. This control is arranged so that the selector switch may be positioned remotely from the heating pad for easy actuation by the user. Moreover, by using a half-wave rectifier in connection with the securing of the multiple temperature settings this rectifier may be arranged within the casing of the selector switch, making it possible to employ only three wires between the selector switch and the heating pad without introducing any problem of heat dissipation in the selector switch. This presents a considerable advantage over the resistor type of control wherein a substantial amount of heat must be dissipated in some manner at the switch casing if the resistor is placed therein.

Finally by the use of the circuit arrangement employed, a wide differential of temperature between the various temperature settings may be secured. Thus, for example, there is about a fifty percent difference between the energy supplied to the auxiliary heater in the low and medium temperature positions resulting in a substantial difference in temperature of the heating pad. By way of example, in one practical embodiment of my invention the low temperature setting was 130 degrees F., the medium temperature setting was 150 degrees F., and the high temperature setting was 170 degrees F. It will be obvious, of course, that variations in the exact temperature value may be secured by shifting the location of the connection of the line 12 to the heating element 3, as already discussed above, by varying the resistance value of the auxiliary heater 9, and by varying the distance between the auxiliary heater 9 and the control thermostat 5.

Another embodiment of my invention is shown in Figs. 5, 6 and 7. The same numerals have been used to designate corresponding parts in Figs. 5, 6 and 7 and in Figs. 1 through 4, inclusive. The circuit employed in Figs. 5, 6 and 7 differs from that described above in that the half-wave rectifier 15 is connected, in the medium temperature setting, in parallel rather than in series with the auxiliary heater 9, and the auxiliary heater 9 is arranged to be connected in series with the main heating element 3 in the medium and low temperature settings. In order to effect the proper connections by means of the selector switch, designated 2a, in this modified circuit arrangement, the conducting bar or strip 18 has been replaced by two relatively short conducting strips or contacts 21 and 22. The selector switch has been further modified by replacing the contact or terminal 11 by an elongated conducting bar or strip 11a.

Referring to Fig. 5, it can be seen that the terminal or elongated strip 11a is connected by the line 10 to one end of the auxiliary heater 9. The other end of the auxiliary heater 9 is connected in series with the heating element 3 at the point 18a. The terminal 22 is connected by the line 19 to one end of the heating element 3 at 18a. The terminal 21 is connected to the line 19 through the half-wave rectifier 15.

The active portions of the modified circuit in the low temperature position are shown in Fig. 6. The low temperature setting is obtained by moving the slider 20 to the low temperature position (indicated by the legend "Lo") wherein the line 8 from the plug 4 is connected through the conducting strip 17 to the conducting strip 11a. This completes a circuit through the line 10 to the auxiliary heater 9 in series with the heating element 3. As can be seen from Fig. 6, the auxiliary heater 9 in the low temperature setting is connected in series with the heating element 3 and supplies heat to the thermostat 5, causing this thermostat to reach its cut-off temperature at a relatively low temperature of the heating pad.

If it is desired to obtain a somewhat higher, or medium, temperature, the selector switch 2a is actuated to move the slider 20 to the right to the position indicated by the legend "Med.". In this position the slider establishes a circuit from the conducting strip 17 to the terminal 21 and also from the conducting strip 17 to the elongated conducting strip 11a. The connection to the strip 11a, as indicated above, establishes a circuit through the auxiliary heater 9 in series with the heating element 3. The connection to the terminal 21 establishes a circuit through the half-wave rectifier 15 in parallel with the auxiliary heater 9.

The active portions of the circuit in the medium temperature setting are shown in Fig. 7. It can be seen that the active portions of the circuit in Fig. 7 differ from those in Fig. 6 in that the half-wave rectifier is connected in parallel with the auxiliary heater 9. The half-wave rectifier 15 in effect forms a short across the auxiliary heater 9 during half of each cycle of the alternating current supplied thereto. Thus the energy supplied to the auxiliary heater 9 in this setting of the selector switch is about half of that supplied when the half-wave rectifier is not connected in the circuit. Therefore, less heat is supplied by the auxiliary heater to the control thermostat 5 and a higher temperature of the heating pad is reached before the control thermostat reaches its cut-off temperature.

In the high temperature setting of the modified circuit, that is when the slider 20 is moved to the position indicated by the legend "Hi," the active portions of the circuit are identical with those illustrated in Fig. 4. In other words, in the high temperature setting, only the heating element 3 is connected in the circuit and no energy is supplied to the auxiliary heater 9. Accordingly, since the control thermostat 5 receives no heat from the auxiliary heater 9, a high temperature of the heating pad is reached before the control thermostat is brought to its cut-off temperature.

As in the case of the circuit shown in Figs. 1 through 4, inclusive, the modified circuit illustrated in Figs. 5, 6 and 7 provides for a wide spread between the low, medium and high temperature settings of the heating pad.

In Fig. 8 there is illustrated the active portion of the circuit of a modified form of my invention in the medium temperature setting. The circuit differs from that shown in Figs. 1 through 4, inclusive, and specifically from the corresponding simplified diagram shown in Fig. 3 in that a capacitor 23 is added in parallel with the half-wave rectifier 15. By including the capacitor in parallel with the half-wave rectifier, an increased amount of energy is supplied to the auxiliary heater in the medium temperature setting over that which is supplied in the circuit illustrated in simplified form in Fig. 3. Accordingly, the control thermostat 5 in the circuit shown in Fig. 8 will reach its cut-off temperature at a lower temperature of the heating pad than in the circuit shown in Fig. 3. It will be apparent, therefore, that the modified circuit of Fig. 8 may be employed where it is desired for any reason to secure a different spread of temperatures at the various settings and specifically to secure a medium temperature setting which is lower than that obtained with the circuit shown in Figs. 1 through 4, inclusive.

While for convenience my invention has been described in connection with its application to the control of the temperature of a heating pad, it will be apparent that the circuit arrangement disclosed can be used with many other types of heating devices. Accordingly, I do not desire my invention to be limited to the particular constructions shown and described, and I intend by the appended claims to cover all modifications within the spirit and scope of my invention.

What I claim as new and desire to secure by Letters Patent of the United States is:

1. In a heating device, a heating element, a thermostat for controlling the circuit of the heating element, an auxiliary heater for said thermostat, a half-wave rectifier, and means for selectively connecting said rectifier in circuit with said auxiliary heater for varying the current supplied to said auxiliary heater.

2. In a heating device, a heating element, a thermostat for controlling the circuit of the heating element, an auxiliary heater for said thermostat, said auxiliary heater being in series with at least a portion of said heating element, a half-wave rectifier, and means for selectively connecting said rectifier in circuit with said auxiliary heater for varying the current supplied to said auxiliary heater.

3. In a heating device, a heating element, a thermostat for controlling the circuit of the heating element, an auxiliary heater for said thermostat, a half-wave rectifier, and means for selectively connecting said rectifier in series with said auxiliary heater for varying the current supplied to said auxiliary heater.

4. In a heating device, a heating element, a thermostat for controlling the circuit of the heating element, an auxiliary heater for said thermostat, a half-wave rectifier, and means for selectively connecting said rectifier in parallel with said auxiliary heater for varying the current supplied to said auxiliary heater.

5. In a heating device, a heating element, a thermostat for controlling the circuit of said heating element, an auxiliary heater for said thermostat, a half-wave rectifier, and a selector switch for controlling the temperature setting of said heating device, said switch being movable between one position in which said auxiliary heater supplies maximum heat to said thermostat to obtain a low temperature setting of said heating device and a second position in which said half-wave rectifier is connected in circuit with said auxiliary heater to reduce the supply of energy to said auxiliary heater to give a higher temperature setting.

6. The combination of claim 5 in which said half-wave rectifier is connected in series with said auxiliary heater.

7. The combination of claim 5 in which said half-wave rectifier is connected in parallel with said auxiliary heater.

8. The combination of claim 5 in which said half-wave rectifier is connected in series with said auxiliary heater and in which a capacitor is connected in parallel with said half-wave rectifier in the higher temperature setting.

9. In a heating device, a heating element, a thermostat for controlling the circuit of said heating element, an auxiliary heater for said thermostat, a half-wave rectifier, and a selector switch for controlling the temperature setting of said heating device, said switch being movable to a first position in which said auxiliary heater supplies maximum heat to said thermostat to obtain a low temperature setting of said heating device, to a second position in which said half-wave rectifier is connected in circuit with said auxiliary heater to reduce the supply of energy to said auxiliary heater to give a medium temperature setting, and to a third position in which both said auxiliary heater and said rectifier are disconnected from said circuit.

10. In a heating device, a heating element, a thermostat for controlling the circuit of said heating element, an auxiliary heater for said thermostat, said auxiliary heater being in series with at least a portion of said heating element, a half-wave rectifier, and a selector switch for controlling the temperature setting of said heating device, said switch being movable to a first position in which said auxiliary heater supplies maximum heat capacity to said thermostat to obtain a low temperature setting of said heating device, to a second position in which said half-wave rectifier is connected in circuit with said auxiliary heater to reduce the supply of energy to said auxiliary heater to give a medium temperature setting, and to a third position in which both said auxiliary heater and said rectifier are disconnected from said circuit.

11. In a heating device, a heating element, a thermostat for controlling the circuit of said heating element, an auxiliary heater for said thermostat, a half-wave rectifier, and a selector switch for controlling the temperature setting of said heating device, said switch being movable to a first position in which said auxiliary heater supplies maximum heat to said thermostat to obtain a low temperature setting of said heating device, to a second position in which said half-wave rectifier is connected in series with said auxiliary heater to reduce the supply of energy to said auxiliary heater to give a medium temperature setting, and to a third position in which both said auxiliary heater and said rectifier are disconnected from said circuit.

12. In a heating device, a heating element, a thermostat for controlling the circuit of said heating element, an auxiliary heater for said thermostat, a half-wave rectifier, and a selector switch for controlling the temperature setting of said heating device, said switch being movable to a first position in which said auxiliary heater supplies maximum heat to said thermostat to obtain a low temperature setting of said heating device, to a second position in which said half-wave rectifier is connected in parallel with said auxiliary heater to reduce the supply of energy to said auxiliary heater to give a medium temperature setting, and to a third position in which both said auxiliary heater and said rectifier are disconnected from said circuit.

13. The combination of claim 9 wherein said rectifier is disposed at a point remote from said heating device.

14. The combination of claim 9 in which said rectifier is disposed within the casing of said selector switch.

15. The combination of claim 1 in which said auxiliary heater is connected to said heating element at an intermediate point along the length of said heating element.

16. The combination of claim 5 in which said rectifier is disposed within the casing of said selector switch.

References Cited in the file of this patent

UNITED STATES PATENTS

| | | |
|---|---|---|
| 2,452,622 | Youhouse | Nov. 2, 1948 |
| 2,474,189 | Porter | June 21, 1949 |
| 2,481,401 | Davis | Sept. 6, 1949 |